United States Patent [19]
Heidemann

[11] Patent Number: 5,291,326
[45] Date of Patent: Mar. 1, 1994

[54] OPTICAL SIGNAL TRANSMISSION SYSTEM, PARTICULARLY OPTICAL CABLE TELEVISION SYSTEM, WITH MONITORING AND SERVICE-CHANNEL FACILITIES

[75] Inventor: Rolf Heidemann, Tamm, Fed. Rep. of Germany

[73] Assignee: Alcatel N.V., Amsterdam, Netherlands

[21] Appl. No.: 855,615

[22] Filed: Mar. 20, 1992

[30] Foreign Application Priority Data

Mar. 23, 1991 [DE] Fed. Rep. of Germany ....... 4109683

[51] Int. Cl.$^5$ .................... H04B 10/00; H04B 10/24
[52] U.S. Cl. ................... 359/160; 319/110; 319/114; 319/173; 319/341; 372/6
[58] Field of Search ........ 359/160, 162, 174, 176–177, 359/179, 110, 113–114, 154, 124, 173, 341, 143; 372/6; 385/24

[56] References Cited

U.S. PATENT DOCUMENTS

| | | | |
|---|---|---|---|
| 4,994,675 | 2/1991 | Levin et al. | 359/110 |
| 5,058,103 | 10/1991 | Shimizu | 359/124 |
| 5,162,936 | 11/1992 | Taga et al. | 359/177 |

FOREIGN PATENT DOCUMENTS

| | | |
|---|---|---|
| 0415438 | 3/1991 | European Pat. Off. . |
| 0449475 | 10/1991 | European Pat. Off. ............ 359/179 |

OTHER PUBLICATIONS

"B-ISDN", G. H. Doman, *Journal of Lightwave Technology*, vol. 6 No. 11, Nov. 1988, pp. 1720–1727.
Patent Abstracts of Japan vol. 13, No. 280 (E-779( 1989 J JP-A-10 65 938 (Nippon) *Zusammenfassung*.
Patent Abstract of Japan, vol. 12, No. 337 (E-657) 1988 & JP-A-63 099 633 (NEC) *Zusammenfassung*.

*Primary Examiner*—Richard E. Chilcot, Jr.
*Assistant Examiner*—K. Negash

[57] ABSTRACT

A system for optically transmitting a useful signal ($S_1$) from a transmitter (1) over a transmission link which includes either an optical waveguide (3) or a fiber-optic network coupled to a receiver (2). The transmitter (1) transmits the useful signal ($S_1$) and an auxiliary signal ($S_2$) over the transmission link toward the receiver (2) at different wavelengths. Circuits (4a, 4b, 5, 6, 7) at a desired point in the transmission link and analyze the auxiliary signal ($S_2$) and provide a response signal ($S_3$) containing information for monitoring the useful signal. The transmitter (1) receives the response signal ($S_3$) and controls the further transmission of the useful signal ($S_1$) and the auxiliary signal ($S_2$) in accordance with the information in the response signal ($S_3$).

6 Claims, 1 Drawing Sheet

OPTICAL SIGNAL TRANSMISSION SYSTEM, PARTICULARLY OPTICAL CABLE TELEVISION SYSTEM, WITH MONITORING AND SERVICE-CHANNEL FACILITIES

TECHNICAL FIELD

The present invention relates to optical signal transmission systems.

BACKGROUND OF THE INVENTION

The need for transmission systems in which the signals are optically transmitted to the terminal (TV receiver, home computer, etc.) is obvious today. One of the reasons is that in optical transmission systems, the signal bandwidth can be considerably wider than in electric transmission systems. Such an optical transmission system is described schematically in the journal "Funkschau", No. 22, 1990, page 56.

In this prior art system, no provision is made for monitoring the transmitted signal. However, network providers assume responsibility for the quality of the signal up to a given point in the transmission link. They therefore require the network manufacturer to provide a facility which makes it possible to monitor a signal at this point (henceforth called "monitoring point").

It is the object of the present invention to provide a system which permits such signal monitoring.

This object is attained by a system for optically transmitting a useful signal from a transmitter over an optical waveguide (3) or a fiber-optic network to a receiver, characterized in that in addition to the useful signal ($S_1$), the transmitter (1) transmits an auxiliary signal ($S_2$), that the useful signal and the auxiliary signal are transmitted over the same optical waveguide (3) or the same fiber-optic network toward the receiver (2) at different wavelengths, that at a desired point in the transmission link, means (4a, 4b, 5, 6, 7) are provided for extracting and analyzing the auxiliary signal ($S_2$) and for transmitting the results of the analysis, if necessary together with other information, as a response signal ($S_3$) over the same optical waveguide (3) or the same fiber-optic network to the transmitter (1), and that the transmitter includes means for controlling the further transmission of the useful signal and the auxiliary signal in accordance with the response signal.

A further advantageous feature of the invention is that before the desired point the useful signal ($S_1$) and the auxiliary signal ($S_2$) pass through a fiber-optic amplifier (9) comprising a pump source (7), and that the pump source (7) also serves to transmit the response signal ($S_3$).

An additional feature is that the wavelength at which the auxiliary signal ($S_2$) is transmitted and the laser of the pump source (7) are so chosen that the auxiliary signal can be passed through the laser without being changed and without interfering with the operation of the laser.

In conventional attempts to attain these objects, it is necessary to convert the optical signal to an electric one. Such a proposal is described in Günter Domann, J. of Lightwave Technology, Vol. 6, 1988, pages 1720–1727.

SUMMARY OF THE INVENTION

The invention eliminates the need to convert the optical useful signal to an electric signal. In addition, the means according to the present invention are suited to setting up a so-called service channel, i.e., they open up the possibility of interactive communication between the monitoring point and the transmitter.

The principle consists in the fact that the transmitter, besides transmitting the useful signal, sends out an auxiliary signal at another wavelength. Because of the different wavelengths, the auxiliary signal can be extracted from the optical waveguide at the monitoring point and then be used to indirectly monitor the quality of the useful signal.

After being separated from the useful signal, the auxiliary signal is converted to an electric signal and analyzed. The results of the analysis are sent in the form of a response signal to the transmitter. The latter controls the further transmission of the useful and auxiliary signals in accordance with the information contained in the response signal.

The auxiliary signal need not be transmitted continuously but may also be sent from time to time. It may be an analog or digital signal, a test signal with variable or invariable message content, a voice signal from the operators, and the like. The same applies to the response signal.

It is apparent that the system according to the invention can also be used for interactive communication between units or persons at the monitoring point and units or persons at the transmitter. This use corresponds to that of a service channel.

BRIEF DESCRIPTION OF THE DRAWINGS

The invention will be explained in greater detail with reference to the accompanying drawing, in which:

FIG. 1 shows a transmitter 1, a receiver 2, an optical waveguide 3 interconnecting the transmitter and receiver, a monitoring point with a first coupler 4a and a second coupler 4b, a photodiode 5, a monitoring device 6, a light source 7, a useful signal $S_1$, an auxiliary signal $S_2$, and a response signal $S_3$. The first coupler 4a extracts the auxiliary signal $S_2$ from the optical waveguide 3, so that it can be passed to the photodiode 5. The latter converts the optical auxiliary signal $S_2$ to an electric signal. The monitoring device 6 analyzes the electric signal and, together with the light source 7, generates the optical response signal $S_3$. This response signal is coupled by the coupler 4b into the optical waveguide 3 in a direction opposite to that of the useful signal, thus conveying to the transmitter 1 information that can be used for the further transmission of the useful signal $S_1$ and the auxiliary signal $S_2$.

The transmitter may, for example, be part of the center ("head end") of an optical cable-television network, the receiver a TV set, and the monitoring point a subscriber entrance unit or a so-called network termination point. The invention can be used in connection with any application where a transmitter is connected via an optical waveguide to a receiver or via a fiber-optic network to many receivers and where signal monitoring is to take place somewhere between the transmitter and the receiver(s).

In a preferred embodiment of the invention, the signal monitoring is combinbed with signal amplification. If use is made of a fiber-optic amplifier with a light-amplifying (e.g., erbium-doped) length of fiber, the pump source of this amplifier can also be used to generate the response signal. To this end, the pump light is coupled into the light-amplifying length of fiber in a direction opposite to that of the useful signal. Thus, a portion of the pump light (namely that which was absorbed neither in the light-amplifying length of fiber nor in the optical waveguide) will reach the transmitter. The monitoring device produces art electric response signal and modulates the pump source therewith. The pump light thus conveys a message from the monitoring point to the transmitter. The use of the pump light as an information carrier for arbitrary signals is the subject matter of a co-pending application of Assignee, U.S. Ser. No. 07/791,370, filed Nov. 14, 1990, entitled "Optical Communication System with a Fiber Optic Amplifier", which is incorporated herein by reference.

The modulation of the pump light is an intensity modulation. The modulation frequency must be high enough to ensure that the gain of the light-amplifying length of fiber is not modulated. On the other hand, the bandwidth of the response signal must be so small that the signal can still be interpreted after travelling the path to the transmitter, i.e., despite the attenuation introduced on this path. However, this does not impose any limit that could invalidate the principle.

Figure 1:
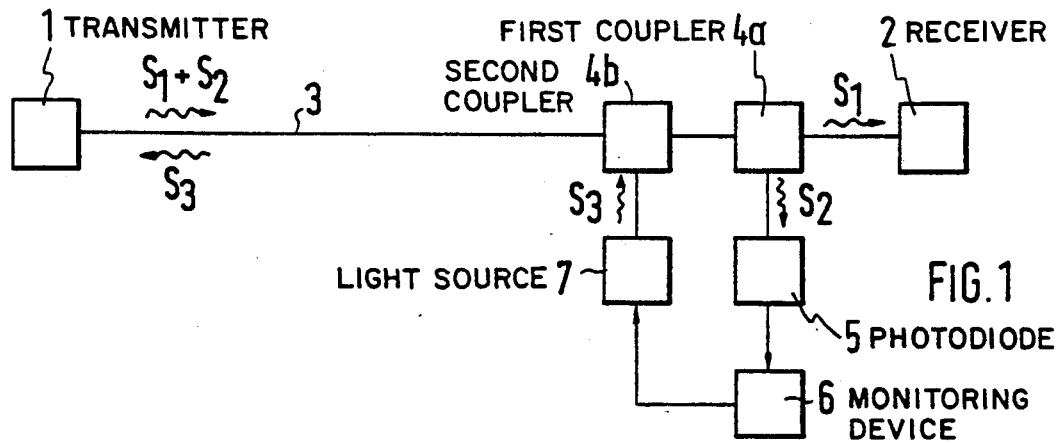
FIG. 1 is a block diagram of the system for transmitting a useful signal and an auxiliary signal and for monitoring the auxiliary signal at a desired point so as to generate a response signal that is sent back to the transmitter.
Figure 2:
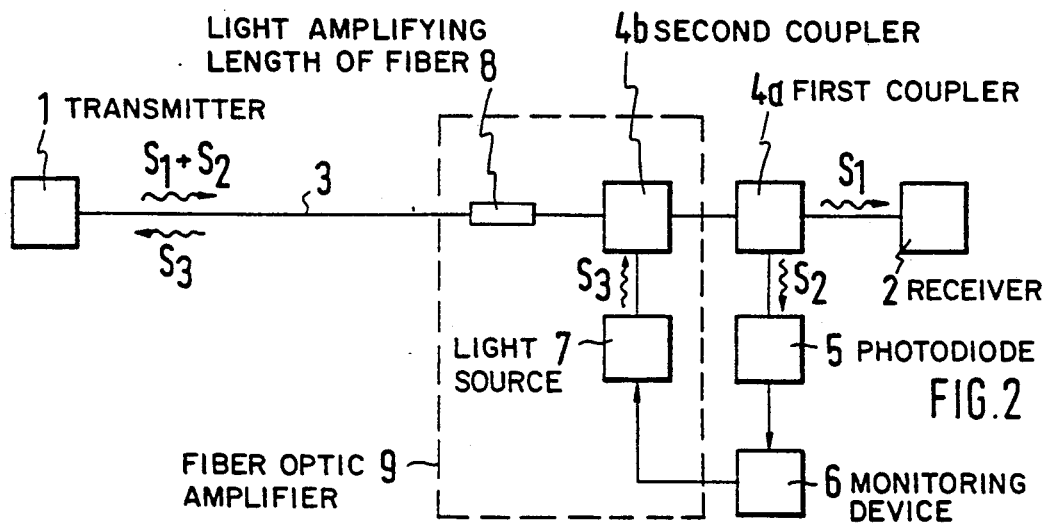
FIG. 2 is a block diagram of the system showing a fiber-optic amplifier.

An embodiment of a system combining signal monitoring and signal amplification in accordance with the invention is shown in FIG. 2. There, all elements correspond to those of FIG. 1 except that a light-amplifying length of fiber 8 has been added, that the wavelength of the signal $S_3$ is the pump wavelength, and that the internal construction of the monitoring device 6 is different if necessary.

If suitable values are chosen for the wavelengths of the light source and the auxiliary signal (e.g., $\lambda_3 = 980$ nm and $\lambda_2 = 1300$ nm), the light source will be transparent to the auxiliary signal. In that case, the auxiliary signal can be passed through the light source without interfering with and being altered by the latter.

Figure 3:
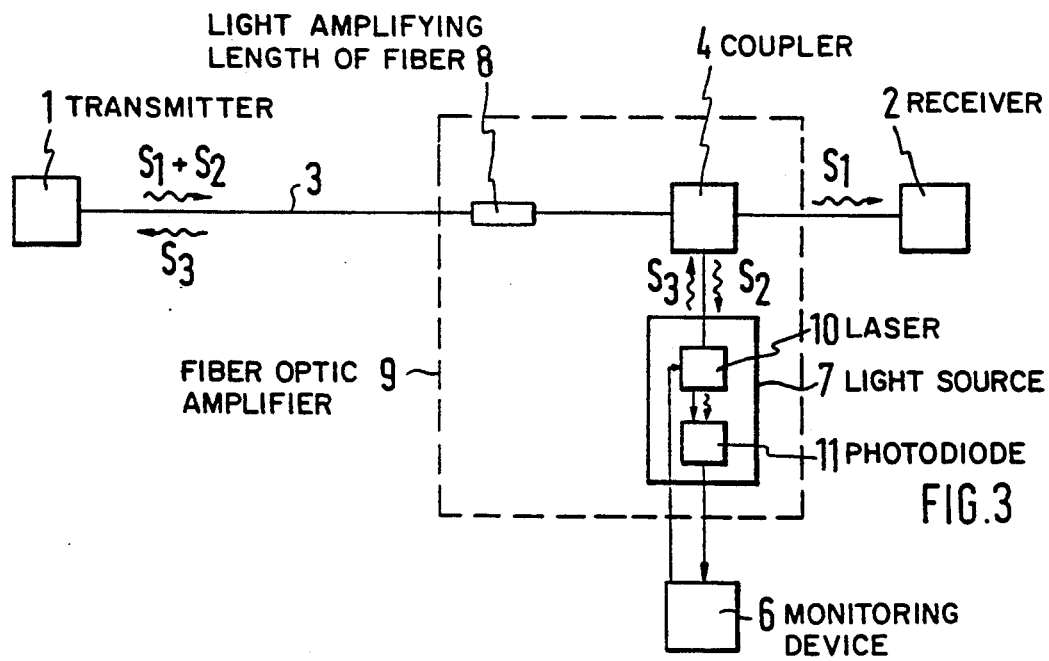
FIG. 3 shows an alternative version of the system of FIG. 2.

This permits a simplification of the systems of FIGS. 1 and 2. The simplified version of the system of FIG. 2 is shown in FIG. 3. In addition to a laser 10, the light source 7 of FIG. 3 includes a photodiode 11 as is commonly used to monitor the laser. In the arrangement of FIG. 3, this photodiode 11 receives not only the backface emission of the laser as usual, but also the auxiliary signal. Since the backface emission of the laser contains mainly low-frequency components white the auxiliary signal contains mainly high-frequency components, the two signals can be readily separated in the monitoring device and processed separately.

The analysis of the backface emission gives information on the condition of the laser. The backface emission can also be used as usual to regulate the average pump power of the laser.

As indicated in FIG. 3, the light source 7, namely its photodiode 11, is connected to the monitoring device 6 by a line over which the received auxiliary signal and the electric signal formed from the backface emission of the laser are transferred to the monitoring device 6. A second line between the monitoring device 6 and the light source 7, namely the laser 10 of the source, serves to supply an electric response signal to the laser, which converts this signal to an optical response signal.

There are many possibilities of analysis which can be incorporated into the electric circuit. For instance, it is possible to determine the signal strength, the signal-to-noise ratio, the condition of the laser, etc.

As it is not the useful signal proper which is analyzed, but only the auxiliary signal, the transmission quality of the useful signal can be inferred from the transmission quality of the auxiliary signal. For optical waveguides now in use, the ratio of the attenuation of two signals of different wavelength on a link of a given length is known, so that the attenuation of the useful signal can be inferred from the attenuation of the auxiliary signal. In the worst case, of course, a failure of the auxiliary signal to appear indicates a break in the fiber-optic link.

As mentioned previously, $S_2$ and $S_3$ can also be used to set up a so-called service channel.

Finally it should be noted that the useful signal and the auxiliary signal may, of course, be composed of two or more signals, and that it is also within the scope of the invention to use two or more auxiliary signals on two or more wavelengths for the purpose of monitoring the useful signal(s) at different points of the transmission link or for service-channel purposes.

I claim:

1. System for optically transmitting a useful signal ($S_1$) from a transmitter (1) over a transmission link including an optical waveguide (3) or a fiber-optic network to a receiver (2), characterized in that the transmitter (1) transmits the useful signal ($S_1$) and an auxiliary signal ($S_2$), the useful signal ($S_1$) and the auxiliary signal ($S_2$) are transmitted over the same optical waveguide (3) or the same fiber-optic network toward the receiver (2) at different wavelengths, at a desired point in the transmission link, means (4a, 4b, 5, 6, 7) are provided for receiving the auxiliary signal ($S_2$) and for transmitting a response signal ($S_3$) containing information for monitoring the useful signal ($S_1$) over the same optical waveguide. (3) or the same fiber-optic network to the transmitter (1), and the transmitter (1) receives the response signal ($S_3$) and controls the further transmission of the useful signal ($S_1$) and the auxiliary signal ($S_2$) in accordance with the information in the response signal ($S_3$).

2. A system as claimed in claim 1, characterized in that before said desired point, the useful signal ($S_1$) and the auxiliary signal ($S_2$) pass through a fiber-optic amplifier (9) comprising a pump source (7), and that the pump source (7) also serves to transmit the response signal ($S_3$).

3. A system as claimed in claim 2, characterized in that the wavelength at which the auxiliary signal ($S_2$) is transmitted and the laser of the pump source (7) are assigned that the auxiliary signal can be passed through the laser without being changed and without interfering with the operation of the laser.

4. A system as defined in claim 3, characterized in that the wavelengths of the auxiliary signal ($S_2$) and the laser of the pump source (7) are respectively 1300 nm and 980 nm.

5. System for optically transmitting a useful signal ($S_1$) from a transmitter (1) over a transmission link including an optical waveguide (3) or a fiber-optic network to a receiver (2), characterized in that the transmitter (1) transmits the useful signal ($S_1$) and an auxiliary signal ($S_2$) over the transmission link toward the receiver (2) at different wavelengths;

means (4a, 4b, 5, 6, 7) are provided at a desired point in the transmission link, for receiving the auxiliary signal ($S_2$) and for providing a response signal ($S_3$) containing information for monitoring the useful signal ($S_1$) over the same optical waveguide (3) or the same fiber-optic network to the transmitter (1);

the transmitter (1) receives the response signal ($S_3$) and controls the further transmission of the useful signal ($S_1$) and the auxiliary signal ($S_2$) in accordance with the information in the response signal ($S_3$);

a fiber-optic amplifier (9) is coupled before the desired point in the transmission link and passes the useful signal ($S_1$), the fiber-optic amplifier (9) having a pump source (7) for receiving the auxiliary signal ($S_2$) and transmitting the response signal ($S_3$);

the pump source and monitoring means (4a, 4b, 5, 6, 7) includes a laser (10) and a photodiode (5) for receiving both the backface emission of the laser (10) and the auxiliary signal ($S_2$); and the wavelength at which the auxiliary signal ($S_2$) is transmitted and the laser (10) of the pump source (7) are assigned so that the auxiliary signal ($S_2$) can be passed through the laser (10) without being changed and without interfering with the operation of the laser (10).

6. System for optically transmitting a useful signal ($S_1$) from a transmitter (1) over a transmission link including an optical waveguide (3) or a fiber-optic network to a receiver (2), characterized in that the transmitter (1) transmits the useful signal ($S_1$) and an auxiliary signal ($S_2$) over the same optical waveguide (3) or the same fiber-optic network toward the receiver (2) at different wavelengths;

means (4a, 4b, 5, 6, 7) are provided at a desired point in the transmission link, for receiving the auxiliary signal ($S_2$) and for providing a response signal ($S_3$) containing information for monitoring the useful signal ($S_1$) over the same optical waveguide (3) or the same fiber-optic network to the transmitter (1);

the transmitter (1) receives the response signal ($S_3$) and controls the further transmission of the useful signal ($S_1$) and the auxiliary signal ($S_2$) in accordance with the information in the response signal ($S_3$); and the means (4a, 4b, 5, 6, 7) for transmitting the response signal ($S_3$) include a light source (7) with a laser (10) and a photodiode (5) for receiving both the backface emission of the laser (10) and the auxiliary signal ($S_2$).

* * * * *